(No Model.)
J. A. I. CLAUDON.
SEWER TRAP.
No. 428,457. Patented May 20, 1890.
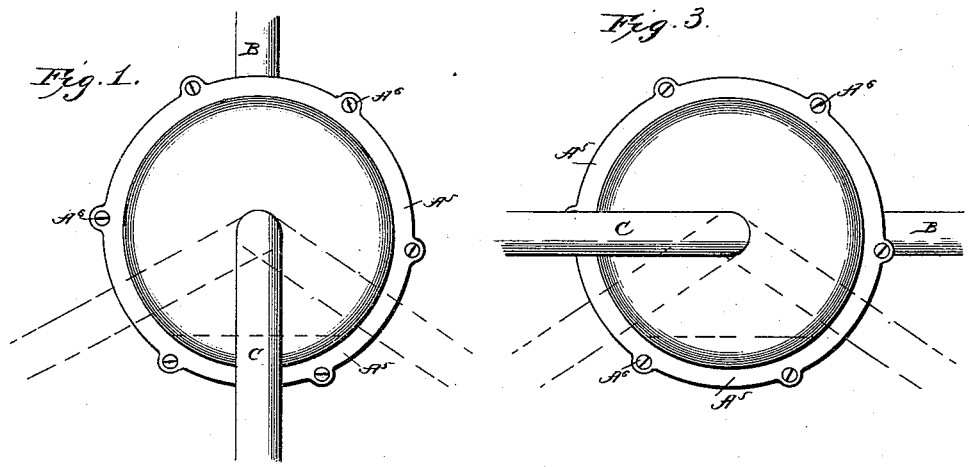
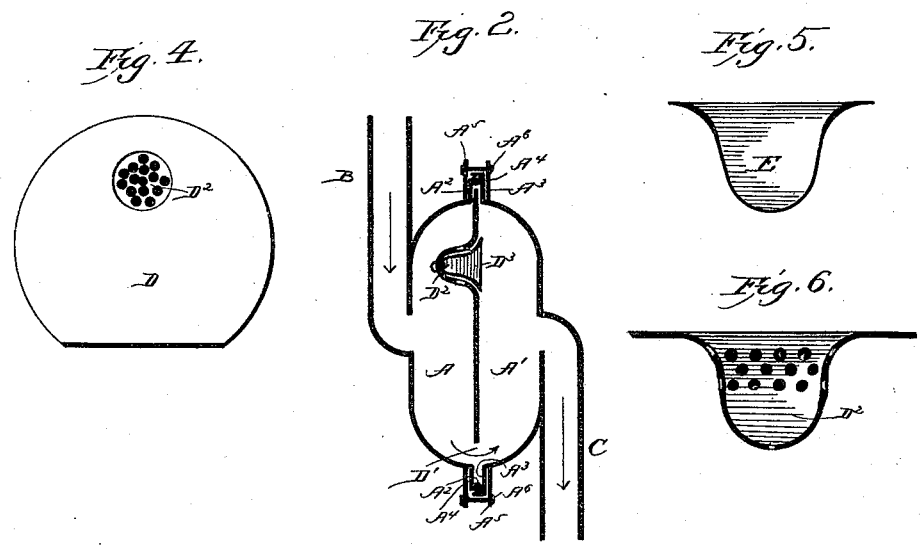
WITNESSES:
F. L. Ourand
C. F. Chisholm
INVENTOR:
Joseph A. I. Claudon
by Sauss Dagger & Co
Attorneys
THE NORRIS PETERS CO., PHOTO-LITHO., WASHINGTON, D. C.

UNITED STATES PATENT OFFICE.

JOSEPH A. I. CLAUDON, OF GLENWOOD SPRINGS, COLORADO.

SEWER-TRAP.

SPECIFICATION forming part of Letters Patent No. 428,457, dated May 20, 1890.

Application filed September 6, 1889. Serial No. 323,166. (No model.)

*To all whom it may concern:*

Be it known that I, JOSEPH A. I. CLAUDON, a citizen of the United States, and a resident of Glenwood Springs, in the county of Garfield and State of Colorado, have invented certain new and useful Improvements in Sewer-Traps; and I do hereby declare that the following is a full, clear, and exact description of the invention, which will enable others skilled in the art to which it appertains to make and use the same.

My invention relates to improvements in sewer-traps; and it consists of the novel details of construction, whereby a simple, durable, and efficient device of this character is produced.

Figures 1 and 3 represent plan views of the trap disposed in a vertical and horizontal position. Fig. 2 represents vertical sections thereof. Fig. 4 represents a detail view of the valved disk, and Figs. 5 and 6 represent detail sectional views.

Referring to the drawings by letter, A and A' designate the two members of the trap, which are of semi-oblate spherical form, and B designates the inlet-pipe and C the outlet-pipe. The member A is formed with a flange $A^2$, and the member A' is formed with an annular recess $A^3$ to receive said flange. Between the flange and seated in the recess is a gasket $A^4$, and the members are secured together by the bands $A^5$ and screws $A^6$, passing through said bands, and thus securing the members.

Between the members A and A' is secured the disk D, the lower part of which is cut away at D' to form communications with the inlet and outlet of the trap, and at a suitable point the disk is concaved to form a valve-seat $D^2$, and said valve-seat is provided with perforations or openings $D^3$. Within the concave valve-seat is secured the valve E, consisting of a thin piece of rubber secured to the edge of the valve-seat. The upper edge of the rubber bell-shaped valve is re-enforced, as shown, to enable the valve to stand the service.

The operation of the trap is as follows: The water enters the inlet, passes under the disk, and out through the outlet. The valve operates when there is a suction by contracting and drawing outward, and the air is admitted through the perforations of the valve-seat. The trap can be accommodated to any position by adjusting the members and pipes, which is readily accomplished by turning the members with relation to each other.

The advantages of my device will be readily apparent to all skilled in the art, and hence need no further comment herein.

Having thus described my invention, I claim and desire to secure by Letters Patent of the United States—

1. The herein-described sewer-trap, consisting of a sectional globe having an inlet and an outlet, a central disk provided with a bell-shaped perforated depression or recess, and a correspondingly-shaped valve fitting in and secured to said recess or depression, substantially as set forth.

2. The herein-described sewer-trap, consisting of a sectional globe having an inlet and outlet, a central disk provided with a bell-shaped perforated depression or recess forming a valve-seat, and also having its lower portion cut away, affording communication between the two sections of the globe, and a flexible valve corresponding to the shape of the valve-seat and secured therein, substantially as set forth.

In testimony that I claim the foregoing as my own I have hereunto affixed my signature in presence of two witnesses.

JOSEPH A. I. CLAUDON.

Witnesses:
W. S. PARKISON,
CHAS. A. LEE.